US006819576B2

(12) United States Patent
Johnson, Jr.

(10) Patent No.: US 6,819,576 B2
(45) Date of Patent: Nov. 16, 2004

(54) POWER CONVERSION APPARATUS AND METHODS USING BALANCER CIRCUITS

(75) Inventor: Robert W. Johnson, Jr., Raleigh, NC (US)

(73) Assignee: Powerware Corporation, Raleigh, NC (US)

( * ) Notice: Subject to any disclaimer, the term of this patent is extended or adjusted under 35 U.S.C. 154(b) by 9 days.

(21) Appl. No.: 10/106,943

(22) Filed: Mar. 25, 2002

(65) Prior Publication Data

US 2002/0109412 A1 Aug. 15, 2002

Related U.S. Application Data (63) Continuation-in-part of application No. 09/887,687, filed on Dec. 10, 2001, which is a continuation of application No. 09/515,138, filed on Feb. 29, 2000, now abandoned, and a continuation of application No. 09/374,180, filed on Aug. 13, 1999, now abandoned.

(51) Int. Cl.[7] .............................................. H02M 7/00
(52) U.S. Cl. ......................... 363/123; 363/37; 363/58; 363/132
(58) Field of Search ............................ 363/17, 34, 37, 363/58, 98, 132, 123, 142; 307/66

(56) References Cited

U.S. PATENT DOCUMENTS

| 4,502,106 A | 2/1985 | Glennon | 363/132 |
|---|---|---|---|
| 4,507,724 A | 3/1985 | Glennon | 363/132 |
| 4,894,765 A | 1/1990 | Kahkipuro | 363/124 |
| 5,111,374 A | 5/1992 | Lai et al. | 363/37 |
| 5,111,376 A | 5/1992 | Mehl | 363/71 |

(List continued on next page.)

FOREIGN PATENT DOCUMENTS

| EP | 0 420 628 A2 | 4/1991 |
|---|---|---|
| EP | 1 005 132 A2 | 5/2000 |
| JP | 05260610 | 10/1993 |
| JP | 07046861 | 2/1995 |
| JP | 8-126352 | 5/1996 |
| JP | 10066351 | 3/1998 |
| WO | WO 94/23482 | 10/1994 |

OTHER PUBLICATIONS

Rooij et al., "A Novel Unity Power Factor Low EMI Uninterruptible Power Supply," IEEE, 1996, pp. 1278–1283.

International Search Report, PCT/US00/20593, Dec. 29, 2000.

International Search Report, PCT/US01/05594, Nov. 19, 2001.

European Search Report, EP 1076 403 A3, date of publication Jan. 2, 2002.

Primary Examiner—Bao Q. Vu
(74) Attorney, Agent, or Firm—Myers Bigel Sibley & Sajovec (57) ABSTRACT

A power conversion apparatus, such as an uninterruptible power supply (UPS), includes an input port, an output port, and first and second busses. An output circuit, for example, a half-leg inverter, is coupled to the first and second busses and to the output port and operative to transfer power therebetween. An auxiliary DC voltage generator circuit, for example, a battery converter circuit, is operative to generate DC voltages on the first and second busses. A multifunction rectifier circuit is coupled to the input port and to the first and second busses, the multifunction rectifier circuit operative to generate DC voltages on the first and second busses from an AC power source at the input port when the apparatus is operating in a first mode (e.g., an AC powered operational mode). The multifunction rectifier circuit is operative to control relative magnitudes of the DC voltages generated by the auxiliary DC voltage generator circuit when the apparatus is operating in a second mode (e.g., a battery-powered operational mode). Related power conversion methods are described.

46 Claims, 3 Drawing Sheets

U.S. PATENT DOCUMENTS

| | | | |
|---|---|---|---|
| 5,119,283 A | 6/1992 | Steigerwald et al. | 363/27 |
| 5,126,585 A | 6/1992 | Boys | 307/66 |
| 5,229,650 A | 7/1993 | Kita et al. | 307/66 |
| 5,237,208 A | 8/1993 | Tominaga et al. | 307/66 |
| 5,253,157 A | 10/1993 | Severinsky | 363/98 |
| 5,343,079 A | 8/1994 | Mohan et al. | 307/105 |
| 5,463,283 A | 10/1995 | Sanderson | 315/209 R |
| 5,502,630 A | 3/1996 | Rokhvarg | 363/84 |
| 5,592,369 A | 1/1997 | Bjorklund | 363/35 |
| 5,610,805 A | 3/1997 | Gupta | 363/37 |
| 5,644,483 A | 7/1997 | Peng et al. | 363/37 |
| 5,654,591 A | 8/1997 | Mabboux et al. | 307/66 |
| 5,710,696 A | 1/1998 | Reynolds et al. | 363/37 |
| 5,781,422 A | 7/1998 | Lavin et al. | 363/37 |
| 5,824,990 A | 10/1998 | Geissler et al. | 219/130.21 |
| 5,901,056 A | 5/1999 | Hung | 307/54 |
| 5,978,236 A | 11/1999 | Faberman et al. | 363/37 |
| 5,982,652 A | 11/1999 | Simonelli et al. | 307/26 |
| 6,005,362 A | 12/1999 | Enjeti et al. | 318/479 |
| 6,014,322 A | 1/2000 | Higashi et al. | 363/65 |
| 6,310,787 B2 | 10/2001 | Ito et al. | 363/34 |

POWER CONVERSION APPARATUS AND METHODS USING BALANCER CIRCUITS

RELATED APPLICATIONS

The present application is a continuation-in-part of U.S. patent application Ser. No. 09/887,687, filed Dec. 10, 2001, which is incorporated herein by reference and which is a continuation of U.S. patent application Ser. No. 09/515,138, filed Feb. 29, 2000 now abandoned, and U.S. patent application Ser. No. 09/374,180, filed Aug. 13, 1999 now abandoned, both of which are also incorporated herein by reference.

BACKGROUND OF THE INVENTION

The present invention relates to power conversion apparatus and methods, and more particularly, to power conversion apparatus and methods for use, for example, in redundant power supply systems such as uninterruptible power supplies (UPSs)

UPSs are commonly used to provide power to critical equipment, such as computers, medical devices, telecommunications network components and the like. A UPS can provide conditioned, reliable power to such devices in the presence of AC utility failure or degradation conditions, such as blackout or brownout.

Many UPSs use an on-line configuration comprising an input rectifier circuit that receives an AC voltage from an AC power supply (e.g., an AC utility line) and that generates positive and negative DC voltages on DC voltage busses (or "rails"), and an output inverter circuit that generates an AC output voltage from the DC voltages on the DC busses. A commonly used output inverter configuration is the half-leg inverter, which typically includes first and second switches that selectively couple an output inductor to the positive and negative DC busses. In many such UPSs, an auxiliary DC power source, such as a battery coupled to the busses through a battery converter circuit, generates DC voltages on the busses in the event the AC power source fails and/or is degraded in quality.

The battery converter is sometimes unidirectional, i.e., it allows power to flow from the battery to the DC busses, but does not allow power flow from the DC busses back to the battery. When load current delivered by an inverter circuit contains insignificant DC content, such a UPS typically is stable, i.e., the positive and negative DC voltages on the DC busses can be controlled. However, when the output current has a significant DC component, such as may occur when driving a half-wave load or when energizing a magnetic device, the voltage on one of the DC busses may rise to undesirably high levels. This can result in component damage and/or failure.

SUMMARY OF THE INVENTION

According to some embodiments of the invention, a power conversion apparatus, such as an uninterruptible power supply (UPS), includes an input port, an output port, and first and second busses. An output circuit, for example, a half-leg inverter circuit, is coupled to the first and second busses and to the output port and is operative to transfer power therebetween. An auxiliary DC voltage generator circuit, for example, a battery converter circuit, is operative to generate DC voltages on the first and second busses. A multifunction rectifier circuit is coupled to the input port and to the first and second busses. The multifunction rectifier circuit is operative to generate DC voltages on the first and second busses from an AC power source at the input port when the apparatus is operating in a first mode, e.g., an AC powered operational mode. The multifunction rectifier circuit is operative to control relative magnitudes of the DC voltages generated by the auxiliary DC voltage generator circuit when the apparatus is operating in a second mode, e.g., a battery-powered operational mode.

In some embodiments of the invention, the multifunction rectifier circuit comprises an inductor having first and second terminals, a first switch operative to couple and decoupled the first voltage bus to and from the first terminal of the inductor, and a second switch operative to couple and decouple the second voltage bus to and from the first terminal of the inductor. The multifunction rectifier circuit further includes a third switch operative to couple the second terminal of the inductor to the input port in a first switch state and to couple the second terminal of the inductor to a reference voltage bus for the first and second busses in a second switch state. In some embodiments, the third switch is operative to couple the second terminal of the inductor to a phase terminal of the input port in the first switch state and to couple the second terminal of the inductor to a neutral terminal of the input port in the second switch state.

In further embodiments, the multifunction rectifier circuit is operative to selectively control relative magnitudes of the DC voltages generated by the auxiliary DC voltage generator circuit when the apparatus is operating in the second mode. For example, the multifunction rectifier circuit may commence controlling relative magnitudes of the DC voltages generated by the auxiliary DC voltage generator circuit responsive to at least one voltage on at least one of the first and second busses meeting a predetermined criterion, such as excursion beyond a maximum voltage magnitude.

The invention can provide several benefits. For example, in UPS applications, a power converter circuit according to embodiments of the invention can provide a mechanism for controlling voltage excursions on intermediate DC busses during battery-powered operation by using a dual-purpose AC input rectifier circuit that acts as a "balancer" during battery-powered operation, and that generates DC voltages on the DC busses under normal, AC-powered operation. This can allow for the use of a unidirectional battery converter circuit and can obviate the need for additional regulating circuitry to control voltage excursions on the DC busses. By selectively using the "balancer," desired trade-offs between efficiency and stability can be achieved. The invention may be embodied as apparatus and methods.

DETAILED DESCRIPTION

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
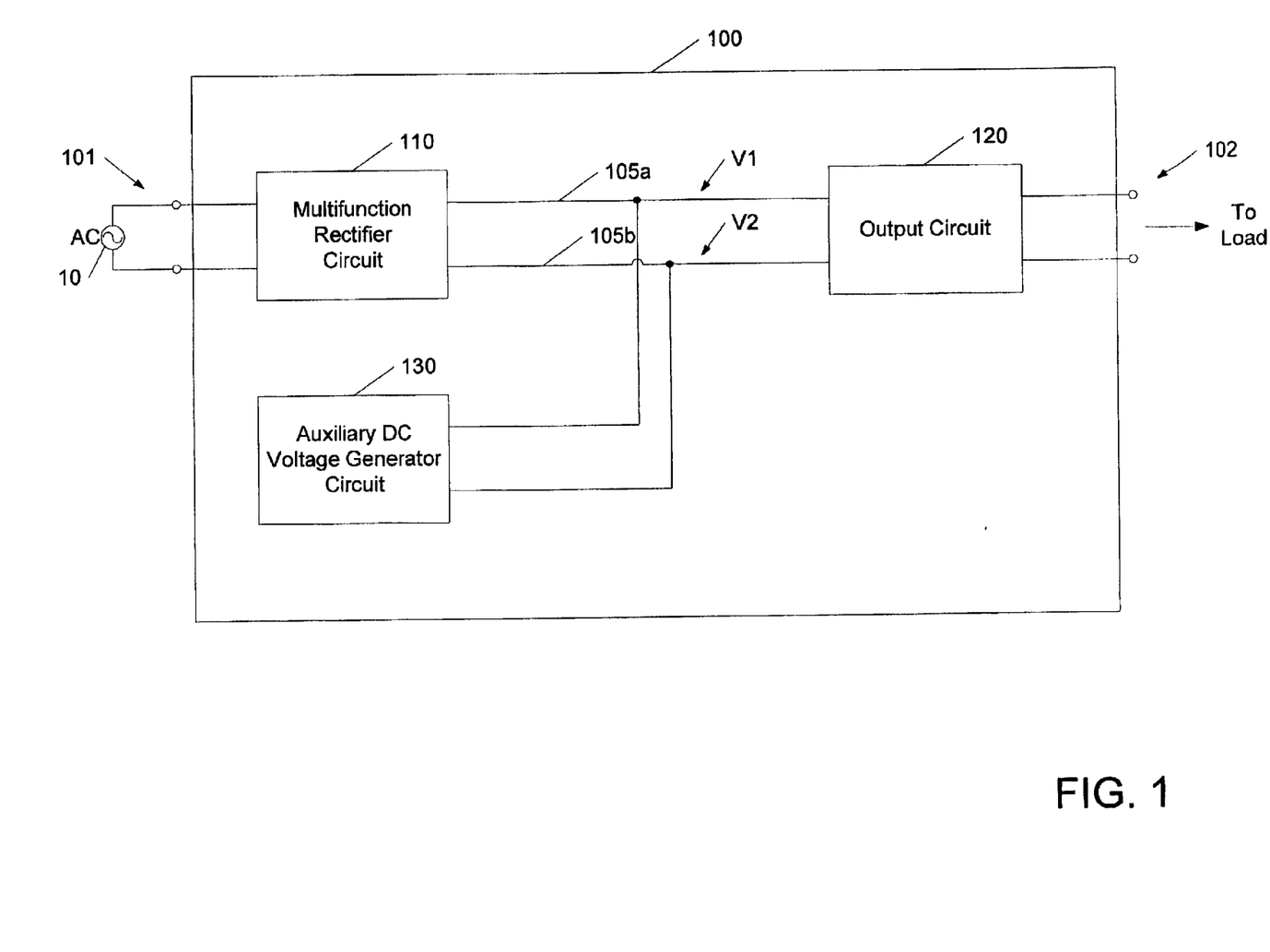
FIG. 1 is a schematic diagram illustrating a power conversion apparatus according to some embodiments of the present invention.

FIG. 1 illustrates a power conversion apparatus 100 according to some embodiments of the invention. The apparatus 100 includes an input port 101 configured to be coupled to an AC power source 10, such as an AC utility line, and an output port 102 configured to be coupled to a load. The apparatus 100 also includes an output circuit 120 that generates an output voltage at the output port 102 from DC voltages V1, V2 on first and second busses 105a, 105b. The apparatus 100 further includes a multifunction rectifier circuit 110 that is operative, in a first operating mode of the apparatus 100, to generate DC voltages V1, V2 on first and second busses 105a, 105b. The apparatus 100 also includes an auxiliary DC voltage generator circuit 130 that is operative to generate the DC voltages V1, V2 in a second operating mode of the apparatus 100, e.g., when the AC power source 10 has failed or is degraded. The multifunction rectifier circuit 110 is further operative to control relative magnitudes of the voltages V1, V2 when the apparatus 100 is operating in the second mode.

The power conversion apparatus 100 may take the form, for example, of an uninterruptible power supply (UPS). For example, the output circuit 120 may comprise an inverter circuit that generates an AC voltage at the output port 102. The auxiliary DC voltage generator circuit may comprise, for example, a battery converter circuit that is configured to be coupled to a battery and that is operative to generate the DC voltages V1, V2 from a DC voltage produced by the battery. It will be appreciated, however, that the auxiliary DC voltage generator circuit may take other forms, such as a converter circuit operative to receive AC or DC power from a power source other than a battery, for example, a second AC utility source or a motor/generator set. It will also be appreciated that the multifunction rectifier circuit 110, the output circuit 120, and the auxiliary DC voltage generator circuit 130 may comprise a number of different electronic circuit components. In general, these circuits may be implemented using discrete electronic components and analog and/or digital integrated circuit components, including control circuitry such as microprocessors and microcontrollers, application specific integrated circuits (ASICs) and the like.

Figure 2:
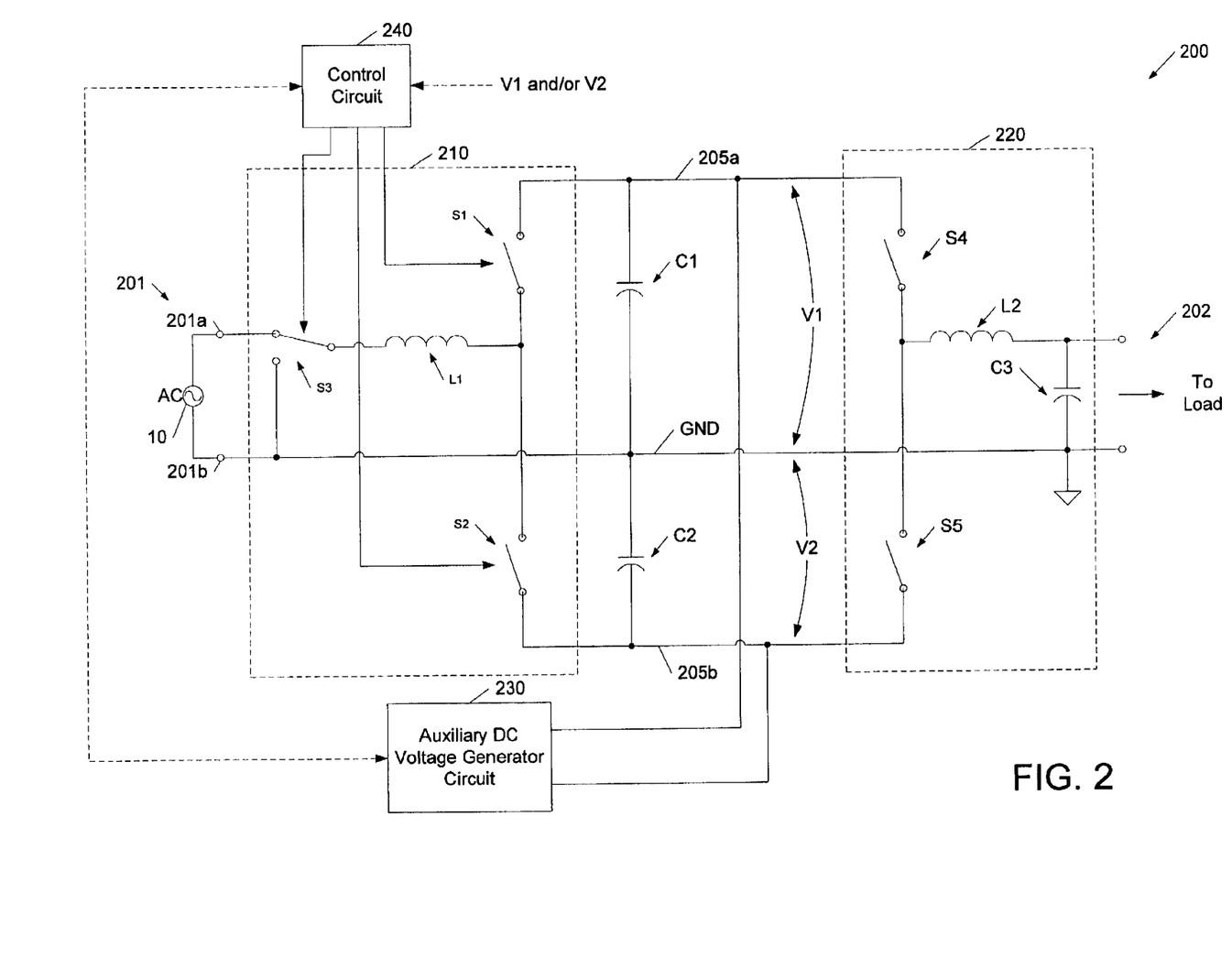
FIG. 2 is a schematic diagram illustrating an uninterruptible power supply apparatus according to further embodiments of the present invention.

FIG. 2 illustrates a power conversion apparatus 200 according to further embodiments of the present invention. The apparatus includes an input port 201, including phase and neutral terminals 201a, 201b, that is configured to be coupled to an AC power source 10. An output port 202 is configured to be connected to a load. A multifunction rectifier circuit 210 of the apparatus 200 is coupled to the input port 201 and to first and second busses 205a, 205b, and is controlled by a control circuit 240. The apparatus 200 further includes first and second storage capacitors C1, C2 that are coupled between respective ones of the first and second busses 205a, 205b and a ground reference bus GND. An output inverter circuit 220 of the apparatus 200 is coupled to the first and second busses 205a, 205b and to the output port 202. An auxiliary DC voltage generator circuit 230 of the apparatus 200 is coupled to the busses 205a, 205b.

As shown, the output inverter circuit 220 has a so-called "half-leg" configuration, including switches S4, S5 that are operative to couple and decouple respective ones of the first and second busses 205a, 205b to the output port 202 via an output inductor L2. In particular, the switches S4, S5 may be operated in a substantially complementary fashion to produce an AC voltage at the output port 202. A combination of the inductor L2 and an output capacitor C3 act as a low pass filter that attenuates unwanted frequency components in the output voltage at the output port 202. In FIG. 2, circuitry for controlling the switches S4, S5 is omitted for purposes of clarity of illustration. Operations of such half-leg inverter circuits are known to those skilled in the art and will not be described in greater detail herein.

The multifunction rectifier circuit 210 includes an inductor L1 and first and second switches S1, S2 that are operative to couple and decouple a terminal of the inductor L1 to and from respective ones of the first and second busses 205a, 205b. The multifunction rectifier circuit 210 further includes a third switch S3 that is operative to couple a second terminal of the inductor L1 to a phase terminal 201a of the input port 101 in a first state and to couple the second terminal of the inductor L1 to a neutral terminal 201b of the input port 201 in a second state. For the configuration shown, the neutral terminal 201b is connected to the ground reference bus GND, which runs to the output port 202.

The control circuit 240 controls the first, second and third switches S1, S2, S3. In particular, the control circuit 240 operates the first, second and third switches S1, S2, S3 such that, in a first mode of operation, the switch S3 couples the phase terminal 201a of the input port 201 to the inductor L1 while the first and second switches S1, S2 are operated in substantially complementary fashion such that DC voltages V1, V2 are generated on the busses 205a, 205b from the AC power source 10. Exemplary operations in such a mode are described in the aforementioned U.S. patent application Ser. No. 09/887,687 to Johnson, incorporated herein by reference.

In a second mode of operation (e.g., when the AC power source 10 fails or produces an unacceptable AC input voltage waveform at the input port 201), the auxiliary DC voltage generating circuit 230 generates the DC voltages V1, V2. The control circuit 240 operates the switch S3 such that the phase terminal 201a is decoupled from the inductor L1 and the ground reference bus GND is coupled to the inductor L1. The control circuit 240 operates the switches S1, S2 such that the multifunction rectifier circuit 210 acts as a "balancer" circuit, i.e., such that it regulates the relative magnitudes of the voltages V1, V2 by transferring between the storage capacitors C1, C2. "Balancer" circuits are described generally in the aforementioned U.S. patent application Ser. No. 09/887,687 to Johnson, incorporated herein by reference.

As shown, the multifunction rectifier circuit 210 may interoperate with the auxiliary DC voltage generator circuit 230. For example, the control circuit 240 may sense an operational state of the auxiliary DC voltage generator circuit 230, e.g., that it has commenced generation of the DC voltages V1, V2, and may operate the switches S1, S2, S3 responsively thereto. The ratio of the voltages V1, V2 is generally controlled by the duty cycles at which the switches S1, S2 operate. For example, the switches S1, S2 of the multifunction rectifier circuit 210 may be operated at substantially complementary duty cycles of approximately 50% such that the voltages V1, V2 are approximately equal in magnitude. It will be appreciated, however, that other duty cycles may be used with the present invention.

According to further aspects of the invention, the rectifier circuit 210 may also selectively operate responsive to at least one of the DC voltages V1, V2. In particular, in the second mode of operation, the control circuit 240 may maintain the switches S1, S2 in open states, such that the inductor L1 is decoupled from the busses 205a, 205b and the rectifier circuit 210 does not act to regulate the voltages V1, V2. Upon one or the both of the voltages V1, V2 meeting a predetermined criterion, such as when the magnitude of one of the voltages V1, V2 exceeds a predetermined threshold, the control circuit 240 may commence operating the switches S1, S2 to provide the balancing function described above and bring the excessive voltage back within a predetermined range.

Figure 3:
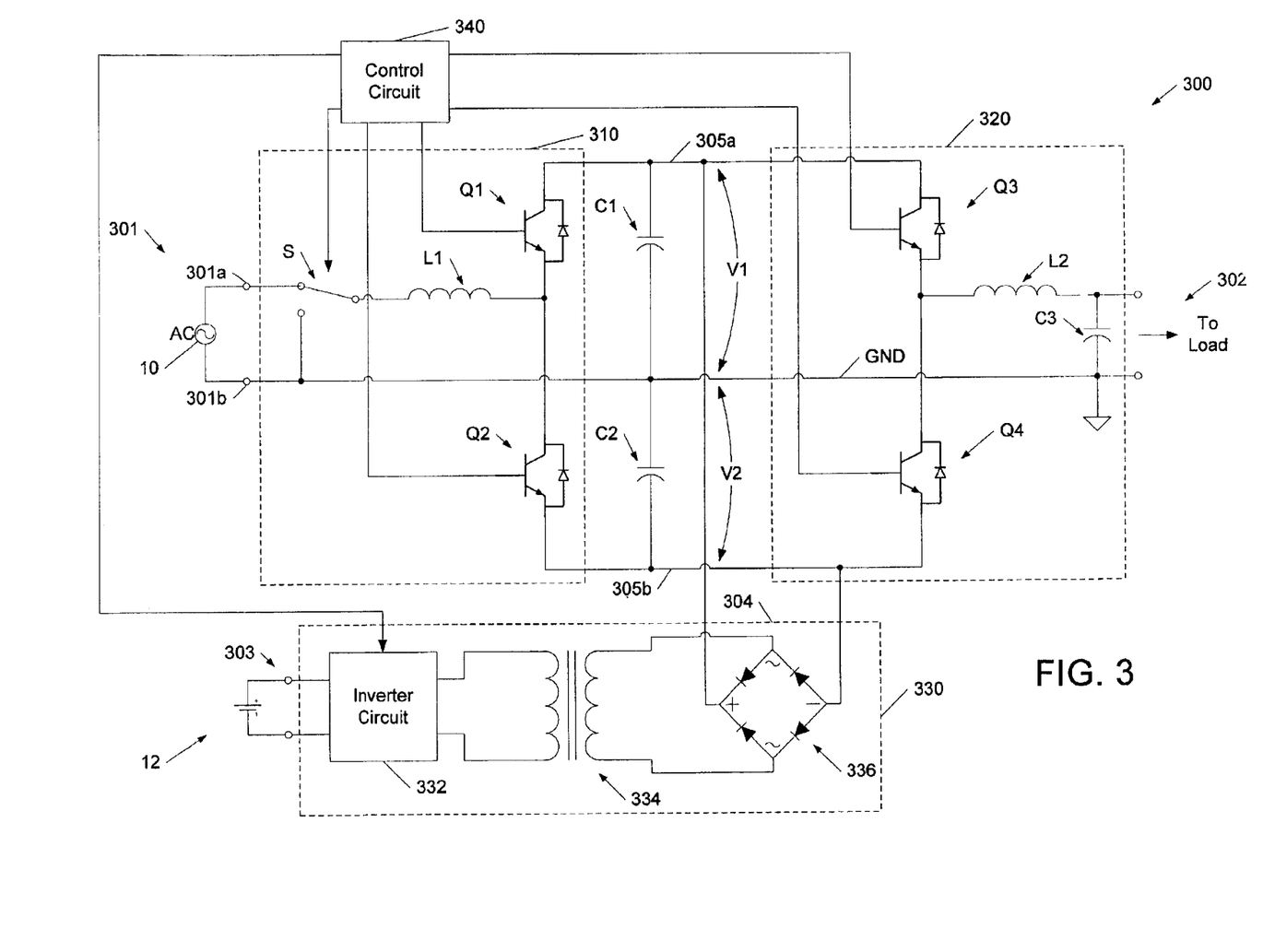
FIG. 3 is a schematic diagram illustrating an uninterruptible power supply apparatus according to still further embodiments of the present invention.

FIG. 3 illustrates a UPS configuration 300 according to further embodiments of the invention. The UPS 300 includes an input port 301, including phase and neutral terminals 301a, 301b, that is configured to be coupled to an AC power source 10. An output port 302 of the UPS 300 is configured to be connected to a load. The UPS 300 includes a multifunction rectifier circuit 310 that is coupled to the input port 301 and to first and second busses 305a, 305b and first and second storage capacitors C1, C2 that are coupled between respective ones of the first and second busses 305a, 305b and a ground reference bus GND. An output inverter circuit 320 of the UPS 300 is coupled to the first and second busses 305a, 305b and to the output port 302. A battery converter circuit 330 is coupled to the busses 305a, 305b. A control circuit 340 controls the multifunction rectifier circuit 310, the output inverter circuit 320 and the battery converter circuit 330.

As shown, the output inverter circuit 320 has a half-leg configuration, including transistor switches Q3, Q4 that are operative to couple and decouple respective ones of the first and second busses 305a, 305b to the output port 302 via an output inductor L2. In particular, the control circuit 340 operates the transistor switches Q3, Q4 in a substantially complementary fashion to produce an AC voltage at the output port 302. A combination of the inductor L2 and an output capacitor C3 act as a low pass filter that attenuates unwanted frequency components in the output voltage at the output port 302.

The battery converter circuit 330 includes a battery input port 303 that is configured to be coupled to a battery 12 and an output port 304 coupled to the first and second busses 305a, 305b. The battery converter circuit 330 further includes an inverter circuit 332 that is coupled to the input port 303, a transformer 334 having a primary winding coupled to the inverter circuit 332, and a rectifier circuit 336 coupled to a secondary winding of the transformer 334 and to the first and second busses 305a, 305b. The control circuit 340 controls the inverter circuit 332.

The multifunction rectifier circuit 310 includes an inductor L1 and first and second transistor switches Q1, Q2 that are operative to couple and decouple a first terminal of the inductor L1 to and from respective ones of the first and second busses 305a, 305b. The multifunction rectifier circuit 310 further includes a switch S (e.g., a mechanical relay or solid state switching device) that is operative to couple a second terminal of the inductor L1 to a phase terminal 301a of the input port 301 in a first state and to couple the second terminal of the inductor L1 to a neutral terminal 301b of the input port 301 in a second state. For the configuration shown, the neutral terminal 301b is connected to the ground reference bus GND, which runs to the output port 302.

The control circuit 340 controls the transistors Q1, Q2 and the switch S of the multifunction rectifier circuit 310, the transistors Q3, Q4 of the inverter circuit 320, and the inverter circuit 332 of battery converter circuit 330. In particular, the control circuit 340 operates the transistors Q3, Q4 of the inverter circuit 320 in a substantially complementary, periodic fashion such that an AC voltage is generated at the output port 302 from DC voltages V1, V2 on the busses 305a, 305b. The control circuit 340 operates the transistors Q1, Q2 and the switch S such that, in a first mode of operation, the switch S couples the phase terminal 301a of the input port 301 to the inductor L1, while the transistors Q1, Q2 are operated in substantially complementary fashion such that the DC voltages V1, V2 are generated on the busses 305a, 305b from the AC power source 10.

In a second mode of operation, for example, when the AC power source 10 fails or produces an unacceptable AC input voltage waveform at the input port 301, the control circuit 340 causes the battery converter circuit 330 to generate the DC voltages V1, V2 from the DC voltage produced at a battery input port 303 by the battery 12. In this mode, the control circuit 340 operates the switch S such that the inductor L1 is decoupled from the phase terminal 301a and coupled to the ground reference bus GND. The control circuit 340 may operate the transistors Q1, Q2 such that the multifunction rectifier circuit 310 regulates the relative magnitudes of the voltages V1, V2.

In particular, in the battery-powered mode of operation, the ratio of the voltages V1, V2 may be controlled by the duty cycles at which the transistor switches Q1, Q2 operate. For example, the transistor switches Q1, Q2 may be operated at substantially complementary duty cycles of approximately 50% such that the voltages V1, V2 are approximately equal in magnitude. Other duty cycles may be used. The control circuit 340 may also selectively operate the rectifier circuit 310 responsive to at least one of the DC voltages V1, V2, such that, for example, the control circuit 340 does not operate the switches Q1, Q2 to regulate the voltages V1, V2 until one or both of the voltages V1, V2 meets a predetermined criterion, e.g., until the voltage magnitude exceeds a predetermined threshold.

In the drawings and foregoing description thereof, there have been disclosed exemplary embodiments of the invention. Terms employed in the description are used in a generic and descriptive sense and not for purposes of limitation, the scope of the invention being set forth in the following claims.

That which is claimed:

1. A power conversion apparatus, comprising:
    an input port;
    an output port;
    first and second busses;
    an output circuit coupled to the first and second busses and to the output port and operative to transfer power therebetween;
    an auxiliary DC voltage generator circuit operative to generate DC voltages on the first and second busses; and
    a multiflinction rectifier circuit coupled to the input port and to the first and second busses, the multifunction rectifier circuit operative to generate DC voltages on the first and second busses from an AC power source at the input port when the apparatus is operating in a first mode and to control relative magnitudes of the DC voltages generated by the auxiliary DC voltage generator circuit when the apparatus is operating in a second mode.

2. An apparatus according to claim 1, wherein the multifunction rectifier circuit comprises:

an inductor having first and second terminals;

a first switch operative to couple and decouple the first voltage bus to and from the first terminal of the inductor;

a second switch operative to couple and decouple the second voltage bus to and from the first terminal of the inductor; and a third switch operative to couple the second terminal of the inductor to the input port in a first switch state and to couple the second terminal of the inductor to a reference voltage bus for the first and second busses in a second switch state.

3. An apparatus according to claim 2, wherein the third switch is operative to couple the second terminal of the inductor to a phase terminal of the input port in the first switch state and to couple the second terminal of the inductor to a neutral terminal of the input port in the second switch state.

4. An apparatus according to claim 1, wherein the multifunction rectifier circuit is operative to selectively control relative magnitudes of the DC voltages generated by the auxiliary DC voltage generator circuit when the apparatus is operating in the second mode.

5. An apparatus according to claim 4, wherein the multifunction rectifier circuit is operative to commence controlling relative magnitudes of the DC voltages generated by the auxiliary DC voltage generator circuit responsive to at least one voltage on at least one of the first and second busses.

6. An apparatus according to claim 1, wherein the auxiliary DC voltage generator circuit comprises a battery converter circuit having a battery input port configured to be coupled to a battery and an output port coupled to the first and second busses.

7. An apparatus according to claim 6, wherein the battery converter circuit comprises:

an inverter circuit coupled to the battery input port;

a transformer having a primary winding coupled to the inverter; and a rectifier circuit coupled between a secondary winding of the transformer and the first and second busses.

8. An apparatus according to claim 1, wherein the output circuit comprises a half-leg inverter circuit.

9. An uninterruptible power supply apparatus, comprising:

an AC input port configured to be coupled to an AC power source;

a battery input port configured to be coupled to a battery;

an output port configured to be coupled to a load;

first and second busses;

a half-leg inverter circuit coupled to the first and second busses arid to the output port;

a battery converter circuit coupled to the battery input port and the first and second busses; and a multifunction rectifier circuit coupled to the AC input port and the first and second busses, the multifunction rectifier circuit operative to generate DC voltages on the first and second busses when the apparatus is operating in a first mode and to control relative magnitudes of DC voltages generated by the battery converter circuit on the first and second busses when the apparatus is operating in a second mode.

10. An apparatus according to claim 9, wherein the battery converter circuit is operative to provide unidirectional power transfer from the battery to the first and second busses.

11. An apparatus according to claim 9, wherein the battery converter circuit comprises:

an inverter circuit coupled to the battery input port;

a transformer having a primary winding coupled to the inverter; and a rectifier circuit coupled between a secondary winding of the transformer and the first and second busses.

12. An apparatus according to claim 9, wherein the multifunction rectifier circuit comprises:

an inductor having first and second terminals;

a first switch operative to couple and decouple the first voltage bus to and from the first terminal of the inductor;

a second switch operative to couple and decouple the second voltage bus to and from the first terminal of the inductor; and a third switch operative to couple the second terminal of the inductor to the input port in a first switch state and to couple the second terminal of the inductor to a reference voltage bus for the first and second busses in a second switch state.

13. An apparatus according to claim 12, wherein the third switch is operative to couple the second terminal of the inductor to a phase terminal of the AC input port in the first switch state and to couple the second terminal of the inductor to a neutral terminal of the AC input port in the second switch state.

14. An apparatus according to claim 12, wherein the multifunction rectifier circuit is operative to intermittently control relative magnitudes of the DC voltages generated by the battery convener circuit when the apparatus is operating in the second mode.

15. An apparatus according to claim 14, wherein the multifunction rectifier circuit is operative to commence controlling relative magnitudes of the DC voltages generated by the battery converter circuit responsive to at least one voltage on at least one of the first and second busses.

16. A power conversion apparatus, comprising:

first and second busses;

a DC voltage generator circuit operative to generate DC voltages on the first and second busses;

an AC output circuit coupled to the first and second busses and operative to generate an AC output voltage from DC voltages on the first and second busses; and a balancer circuit operative to control relative magnitudes of DC voltages on the first and second busses by selectively coupling the first and second busses to a reference bus via an inductor.

17. An apparatus according to claim 16, wherein the balancer circuit is operative to control relative magnitudes of DC voltages produced by the DC voltage generator circuit in a first mode of operation and wherein the balancer circuit is operative to generate DC voltages on the first and second busses from an AC power source in a second mode of operation.

18. An apparatus according to claim 17, wherein the balancer circuit comprises a rectifier circuit.

19. An apparatus according to claim 18, wherein the rectifier circuit comprises:

an inductor;

first and second switches operative to couple and decouple respective ones of the first and second busses to the reference bus via the inductor.

20. An apparatus according to claim 17, wherein the DC voltage generator circuit comprises a battery converter circuit.

21. An apparatus according to claim 16, wherein the reference bus comprises a ground reference bus.

22. A power conversion method comprising:
causing a rectifier circuit to produce DC voltages on first and second busses from an AC power source coupled to the rectifier circuit;
producing DC voltages on the first and second busses from a secondary power source; and
operating the rectifier circuit to control relative magnitudes of the DC voltages produced from the secondary power source.

23. A method according to claim 22, further comprising producing an AC voltage from DC voltages on the first and second busses.

24. A method according to claim 22, wherein operating the rectifier circuit to control relative magnitudes of the DC voltages produced from the secondary power source comprises alternately coupling ones of the first and second voltage busses to a reference bus.

25. A method according to claim 24, wherein alternately coupling ones of the first and second voltage busses to a reference bus comprises alternately coupling ones of the first and second voltage busses to the reference bus via an inductor.

26. A method according to claim 22, wherein operating the rectifier circuit to control relative magnitudes of the DC voltages produced from the secondary power source comprises operating the rectifier circuit to control relative magnitudes of the DC voltages produced from the secondary power source responsive to at least one voltage on at least one of the first and second busses.

27. A method according to claim 26, wherein operating the rectifier circuit to control relative magnitudes of the DC voltages produced from the secondary power source responsive to at least one voltage on at least one of the first and second busses comprises refraining from operating the rectifier circuit to control relative magnitudes of the DC voltages produced from the secondary power source until the at least one voltage meets a predetermined criterion.

28. A method according to claim 22, wherein the rectifier circuit comprises an inductor having first and second terminals, a first switch operative to couple and decouple the second terminal of the inductor to and from the first bus, and a second switch operative to couple and decouple the second terminal of the inductor to and from the second bus, and wherein operating the rectifier circuit to control relative magnitudes of the DC voltages produced from the secondary power source comprises:
connecting the first terminal of the inductor to a reference bus; and
operating the first and second switches in a substantially complementary fashion.

29. A method according to claim 28, wherein the reference bus is connected to a neutral terminal of the AC power source.

30. A power conversion method comprising:
producing DC voltages on first and second busses from a power source;
selectively coupling the first and second busses to a reference bus via an inductor to control relative magnitudes of the DC voltages; and
producing an AC output voltage from DC voltages on the first and second busses.

31. A method according to claim 30, wherein producing DC voltages on first and second busses from a power source comprises producing the DC voltages from a battery power source.

32. A method according to claim 31, wherein selectively coupling the first and second busses to a reference bus via an inductor to control relative magnitudes of the DC voltages comprises operating switches of a rectifier circuit having an input configured to be selectively coupled to an AC input port and the reference bus.

33. A method according to claim 30, wherein the reference bus comprises a ground reference bus.

34. A method according to claim 33, wherein the ground reference bus is connected to a neutral terminal of the power source.

35. A power conversion apparatus comprising:
means for producing DC voltages on first and second busses from a power source;
means for selectively coupling the first and second busses to a reference bus via an inductor to control relative magnitudes of the DC voltages; and
means for producing an AC output voltage from DC voltages on the first and second busses.

36. An apparatus according to claim 35, wherein the means for producing DC voltages on first and second busses from a power source comprises means for producing the DC voltages from a battery power source.

37. An apparatus according to claim 35, wherein the means for selectively coupling the first and second busses to a reference bus via an inductor to control relative magnitudes of the DC voltages comprises means for operating switches of a rectifier circuit having an input configured to be selectively coupled to an AC input port and the reference bus.

38. An apparatus according to claim 35, wherein the reference bus comprises a ground reference bus.

39. An apparatus according to claim 38, wherein the ground reference bus is connected to a neutral terminal of the power source.

40. A power converter, comprising:
first and second voltage busses;
a neutral bus;
first and second capacitors coupling respective ones of the first and second voltage busses to the neutral bus;
a first switching circuit operative to selectively couple an input node thereof to the first and second voltage busses;
a balancer circuit operative to selectively couple the neutral bus to the first and second voltage busses; and
a second switching circuit operative to selectively couple the first and second voltage busses to a load connected at an output node thereof.

41. A converter according to claim 40, wherein the balancer circuit selectively couples the first and second voltage busses to the neutral bus responsive to at least one of a voltage at the input node of the first switching circuit and a voltage at the output node of the second switching circuit.

42. A method according to claim 40, wherein the balancer circuit is operative to selectively couple the neutral bus to the first and second voltage busses such that relative magnitudes of respective ones of first and second voltages on the first and second voltage busses with respect to the neutral are constrained to be approximately equal.

43. A method of controlling power transfer between an AC power source and a load, the method comprising the steps of:

selectively coupling first and second voltage busses to a phase bus of the AC power source through a first inductance to produce first and second DC voltages at the first and second voltage busses, respectively;

selectively coupling the first and second voltage busses to the load through a second inductance; and selectively coupling the first and second voltage busses to a neutral bus of the load through a third inductance such that relative magnitudes of the first and second DC voltages across respective first and second capacitors that couple the respective first and second DC voltage busses to the neutral bus are controlled responsive to respective first and second rates at which the first and second voltage busses are coupled to the neutral bus.

44. A method according to claim 43, wherein selectively coupling the first and second voltage busses to a neutral bus of the load through a third inductance comprises selectively coupling the first and second voltage busses to the neutral bus responsive to at least one of an AC voltage of the AC power source and an AC voltage at the load.

45. An uninterruptible power supply, comprising:

first and second busses;

a DC voltage generator circuit operative to generate DC voltages on the first and second busses;

an AC output circuit coupled to the first and second busses and operative to generate an AC output voltage from DC voltages on the first and second busses; and a balancer circuit operative to control relative magnitudes of DC voltages on the first and second busses by selectively coupling the first and second busses to a reference bus via an inductor.

46. An uninterruptible power supply according to claim 45, wherein the DC voltage generator circuit comprises:

a rectifier circuit operative to generate DC voltages on the first and second busses from an AC power source; and a secondary DC power source operative to generate DC voltages on the first and second busses responsive to failure of the AC power source.

* * * * *